Figure 1:
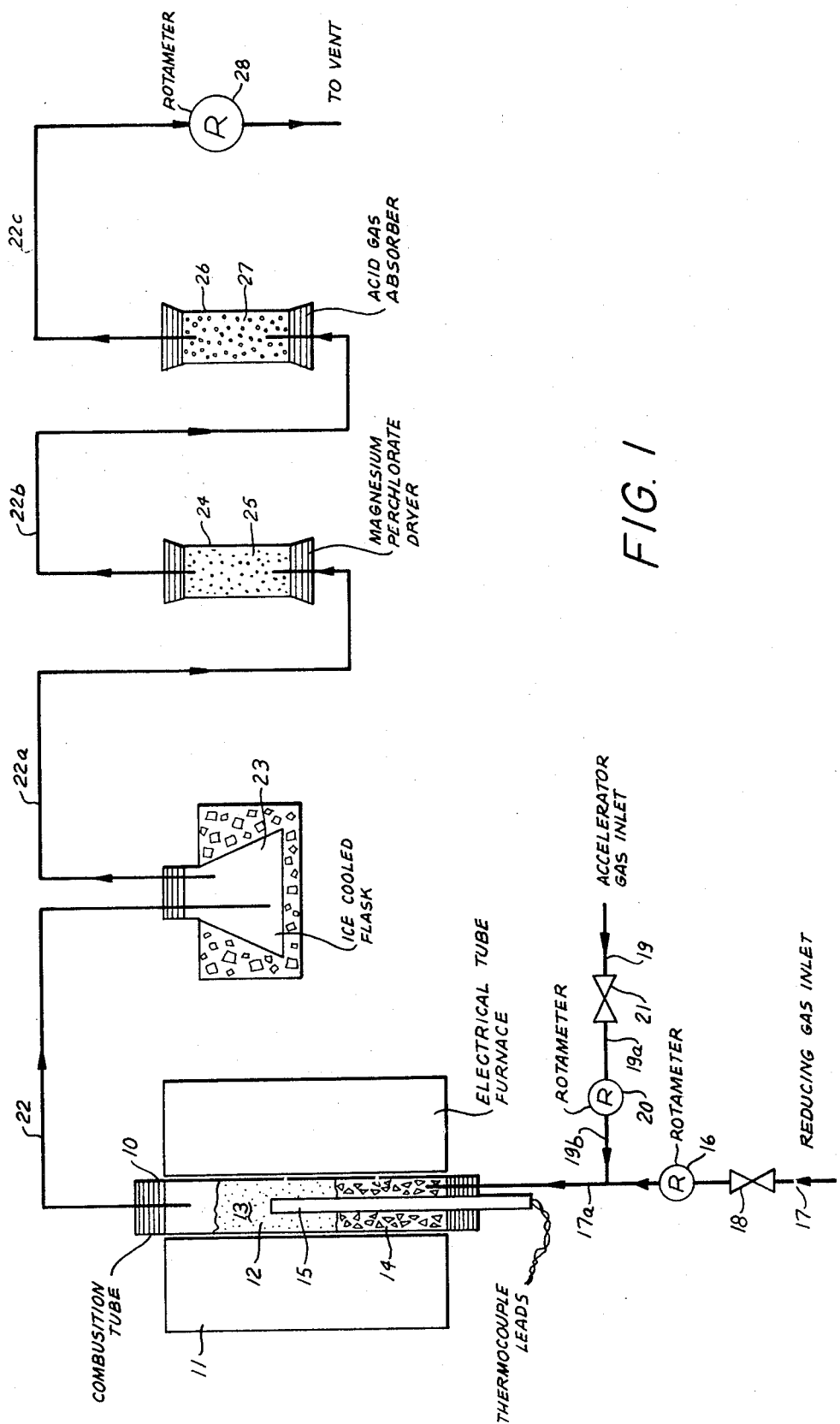

United States Patent

Smith et al.

[15] 3,640,682
[45] Feb. 8, 1972

[54] INCREASING THE RATE OF REACTION IN REDUCING CALCIUM SULFATE TO CALCIUM SULFIDE

[72] Inventors: Jay Charles Smith, Gretna; James R. Reinhardt, New Orleans, both of La.

[73] Assignee: Freeport Minerals Company, New York, N.Y.

[22] Filed: Jan. 8, 1970

[21] Appl. No.: 1,521

[52] U.S. Cl. ..................................23/137, 23/66, 23/134, 23/150, 23/181, 23/224
[51] Int. Cl. ..................................C01b 17/44, C01b 17/42
[58] Field of Search..................23/137, 134, 224, 2, 3, 66, 23/181, 150

[56] References Cited

UNITED STATES PATENTS

| | | | |
|---|---|---|---|
| 462,245 | 11/1891 | Emanuel | 23/137 |
| 1,045,769 | 11/1912 | Bollo et al. | 23/137 |
| 1,492,810 | 5/1924 | Rossberg et al. | 23/137 |
| 1,636,106 | 7/1927 | Naef | 23/137 |
| 1,829,188 | 10/1931 | Rusberg et al. | 23/137 |
| 3,460,912 | 8/1969 | Squires | 23/224 |
| 3,551,100 | 12/1970 | Roberts | 23/137 |
| 3,347,621 | 10/1967 | Papadopoulos et al. | 23/2 R |
| 1,629,396 | 5/1927 | Leuchtenberg | 23/3 R |
| 1,920,626 | 8/1933 | Bragg | 23/3 R |
| 3,524,722 | 8/1970 | Eveny et al. | 23/3 R |
| 3,097,917 | 7/1963 | Dotte Jr. et al. | 23/2 R |

OTHER PUBLICATIONS

C. A. Jacobson's "Encyclopedia of Chemical Reactions," Vol. 3, 1949 Ed., p. 369. Reinhold Publishing Corp., N.Y.
J. W. Mellor's "A Comprehensive Treatise on Inorganic and Theoretical Chemistry," Vol. 14, 1935 Ed., p. 157. Longmans, Green & Co., N.Y.

*Primary Examiner*—Edward Stern
*Attorney*—Furman Rinehart

[57] ABSTRACT

Method for increasing the rate of reduction of calcium sulfate to calcium sulfide in which calcium sulfate is reduced to calcium sulfide by a reductant such as hydrogen, carbon monoxide, coke, or hydrocarbons; the rate of reaction being increased by the addition of a small amount of an accelerator agent, comprising sulfur, sulfur dioxide, a sulfur compound which will generate sulfur vapor, or a gaseous sulfur such as sulfur dioxide which will react or decompose to generate sulfur vapor or gaseous sulfide.

16 Claims, 2 Drawing Figures

INCREASING THE RATE OF REACTION IN REDUCING CALCIUM SULFATE TO CALCIUM SULFIDE

This invention relates to a method for increasing the rate of reduction of calcium sulfate to calcium sulfide and more particularly in those processes wherein calcium sulfate is reacted with reductants, such as coke, hydrogen, carbon monoxide or hydrocarbons such as natural gas or petroleum, or mixtures of these.

The vast abundance of gypsum and anhydrite, in contrast to the rather limited reserves of the conventional sulfur sources (e.g., salt dome deposits, native ores, sour gas, and metal sulfides), has in recent years prompted considerable effort to develop economical processes for the recovery of sulfur from calcium sulfate. These processes usually involve high-temperature reduction or decomposition of the calcium sulfate. Most of the processes which have attracted commercial attention can be divided into two classes; those which result in calcium sulfide from which the sulfur may be subsequently recovered and those which produce calcium oxide along with a volatile sulfur compound such as sulfur dioxide. Temperatures of 2,100° to 2,600° F. are commonly specified for the latter class whereas the reduction of calcium sulfate to calcium sulfide usually requires temperatures of only about 1,600° to 2,000° F. In fact, when using one of the more active reductants such as hydrogen, the reduction to calcium sulfide may commence at temperatures below 1,400° F. However, higher temperatures are normally required to achieve acceptably fast reaction rates. Any inexpensive method of increasing the reaction rates would, of course, permit the adoption of relatively low operating temperatures.

The lower temperatures are desirable because they could reduce heat losses from the reduction vessel, require less heat to bring the calcium sulfate up to the reaction temperature, and require less cooling of the solid product.

Known methods for accelerating the thermal decomposition of calcium sulfate involve the addition of silica, alumina, clays, such as kaolin, sodium chloride, water vapor, ferric oxide or certain other metal oxides, but these methods usually require high temperatures in the neighborhood of 2,000° to 2,600° F. It is believed that in some cases the added material reacts with calcium oxide to form combinations such as dicalcium silicate or tricalcium silicate. In other instances, it is thought that the added material facilitates or promotes this type of combination, and in still other cases, the added compound may have a truly catalytic effect.

For example, in the processes for producing portland cement and sulfuric acid from calcium sulfate, it is known that silica and alumina are mixed with coke and anhydrite to form a carefully proportioned blend which is fed to a high-temperature rotary kiln. It is generally agreed that the coke first reduces part of the calcium sulfate to calcium sulfide. The calcium sulfide thus formed then reacts with additional calcium sulfate to yield sulfur dioxide and calcium oxide. Although the silica and alumina may somewhat accelerate the latter step, their primary purpose is to form the cement clinker by combining with calcium oxide. It is believed to be unlikely that these materials have any catalytic effect on the reduction of calcium sulfate to calcium sulfide.

Insofar as we are aware, there are no successful prior art methods for accelerating the reduction of calcium sulfate to calcium sulfide, except by increasing the reaction temperature.

This invention provides a method of increasing the rate of reduction of calcium sulfate to calcium sulfide in those methods in which the calcium sulfate is reduced to calcium sulfide wherein reductants, such as hydrogen; carbon monoxide; gaseous hydrocarbons, such as natural gas; solid carbonaceous material, such as coke; heavy petroleum or combinations or mixtures of these, are used. These reductants are well known and have been used in processes which involve the reduction of calcium sulfate to calcium sulfide.

In accordance with this invention the rate of reaction between the calcium sulfate and the reductant, such as one of those mentioned in the foregoing, may be materially increased by the addition of an accelerator agent. In accordance with the invention, the rate of reaction may be increased by the addition of sulfur or a sulfur compound which will generate sulfur vapor, or a gaseous sulfur compound, such as hydrogen sulfide, carbonyl sulfide, carbon disulfide, or other sulfur compound, such as sulfur dioxide, which will react or decompose to generate sulfur vapor, or any of the above-mentioned gaseous sulfides in the reaction zone wherein calcium sulfate is reduced with a reductant (such as mentioned above) to form calcium sulfide. The sulfur vapor, sulfur dioxide, or sulfide-forming compounds are herein referred to, for convenience or description, as accelerator agents; these agents serving to increase the rate of reaction in the reaction zone wherein calcium sulfate is reacted with a reductant (as defined above) to reduce calcium sulfate to calcium sulfide.

According to the invention a method is provided whereby a relatively small quantity of an accelerator agent is added to the reactants which react in the reaction vessel where calcium sulfate is reacted with a reductant (as defined hereinabove) to form calcium sulfide with the result that the reaction proceeds at a materially faster rate than results from reducing the calcium sulfate to calcium sulfide with the use of the reductants alone. It has been found that the reaction rate may be materially increased by the addition of a small quantity of any one of the following: sulfur vapor; hydrogen sulfide; carbonyl sulfide; carbon disulfide; or other sulfur compounds, such as sulfur dioxide, which sulfur compounds react or decompose to generate sulfur vapor or any of the above-mentioned gaseous sulfides. As stated above, these agents are referred to herein as accelerator agents. The accelerated rate of reduction can be carried out at temperatures between 1,300° and 1,900° F. and preferably is carried out within the range of 1,400° and 1,700° F. As mentioned above, the reductant may be hydrogen; carbon monoxide; volatile or gaseous hydrocarbons, such as natural gas, petroleum, or carbonaceous solids such as coke; or a combination or mixture of these.

It has been established that below 1,300° F. most of the commonly used reductants, mentioned above, do not react at all or react very slowly with calcium sulfate even in the presence of the gaseous sulfur compounds mentioned above. At 1,400° F. the addition of a few percent of hydrogen sulfide to hydrogen when hydrogen is used as the reductant to reduce calcium sulfate to calcium sulfide, shows a definite improvement in the rate of reaction in conversion of hydrogen to water by hot calcium sulfate and hence an improvement in rate of reduction of the calcium sulfate to calcium sulfide. Such an effect is even more pronounced at 1,500° F.

It has been established that at 1,500° F. the addition of only 1 percent by volume of sulfur dioxide or of hydrogen sulfide to carbon monoxide as a reductant, fed into the reaction zone (wherein calcium sulfate is reduced to calcium sulfide) has approximately tripled the rate of reduction of calcium sulfate to calcium sulfide when passing the reductant plus the sulfur dioxide or hydrogen sulfide (the accelerator agent) as feed gas through the reaction zone at a superficial velocity of about 3 in./sec. (inches per second) through a bed 6 inches deep of −20 to +65 Tyler mesh size particles. Where hydrocarbon gases or carbonaceous solids are used as the reducing agents, a somewhat higher temperature than 1,500° F. may be necessary to obtain the same rate of reaction if sulfur dioxide or hydrogen sulfide is used as accelerator agent.

At temperatures of about 1,800° F. and higher, calcium sulfide and calcium sulfate react very slowly to generate sulfur dioxide. Under these conditions the reduction becomes "autocatalytic" and the addition of gaseous sulfur compounds as accelerators becomes less and less desirable or efficient. And at 1,900° F. this effect reaches a point at which the addition of the accelerator agents as defined herein would not achieve sufficient increase in rate of reaction to warrant their use at 1,900° F. or above.

From the foregoing it will be seen that the process of the invention may be carried out at a temperature substantially lower than 1,900° F., that is, it may be and is preferably carried out at a temperature within the range of 1,400° and 1,700° F. Therefore it is very advantageous over a process which requires temperatures of 1,900° F. and higher at which heat losses by radiation are necessarily much greater.

If a gaseous reductant is used in the practice of the invention, the concentration of the gaseous accelerator agent in the reducing gas fed to the calcium sulfate in the reaction zone may be as low as 0.1 percent volume and need not exceed 10 percent by volume for accelerator agents which are compounds having one sulfur atom per molecule. For those accelerator compounds having two sulfur atoms per molecule the concentration may be from 0.05 to 5 percent by volume in the feed gas. Concentrations below the lower limits mentioned do not provide worthwhile improvement in the rate of reaction in the reaction zone. Increases in concentration above the upper limits mentioned above do not add increased acceleration above those upper limits to warrant higher concentrations. In most instances in which the process of the invention may be practiced, a concentration of accelerator agent in the reducing feed gas within the range of 0.15 to 3.0 percent is preferred. Referring again to the accelerator agents contemplated by the invention, any compound which reacts or decomposes in the system or reaction zone to generate elemental sulfur, hydrogen sulfide, carbonyl sulfide or carbon disulfide and is effective within the range of concentration of 0.05 to 10 percent may be used.

Although it is preferred to use a gaseous reductant in the practice of the method of the invention, the method may be practiced by using solid carbonaceous materials or a heavy petroleum as the reductant, such as coke or heavy petroleum fractions like Bunker C fuel, for example. Since the nongaseous reductants usually react endothermically with calcium sulfate, it is necessary to supply heat in order to sustain the reactions. This may be done by burning either part of the reductant, or some other fuel within the reaction vessel in which the reducing reaction of calcium sulfate to calcium sulfide is carried out. Or heat may be supplied through the walls of the reaction vessel. In such cases the concentration of sulfur vapor, sulfur dioxide, or gaseous sulfides (the accelerator agents) should substantially exceed 0.1 percent by volume of the gases in contact with the calcium sulfate.

Although important, the size of the particles of the calcium sulfate that is to be reduced to calcium sulfide is not critical in the practice of this invention. It is believed that the reduction reaction begins on the surface of the particles with the formation of a calcium sulfide layer and then continues by diffusion of reducing gas inwardly and the gaseous reduction products outwardly. Hence, difficulty may be encountered in causing reaction at the core of very large particles. A size of particle larger than ½-inch diameter is not recommended. The lower limit of particle size will depend largely on the type and design of the reaction vessel apparatus and conditions, such as gas velocity passing through the reaction zone. A charge of calcium sulfate particles which are no more than ½-inch diameter and are retained on a 65-mesh screen (Tyler standard) are the particle sizes preferred for carrying out the method of the invention, but other particle sizes may be chosen if the design of the reduction vessel permits these other particle sizes to be used efficiently.

Figure 2:
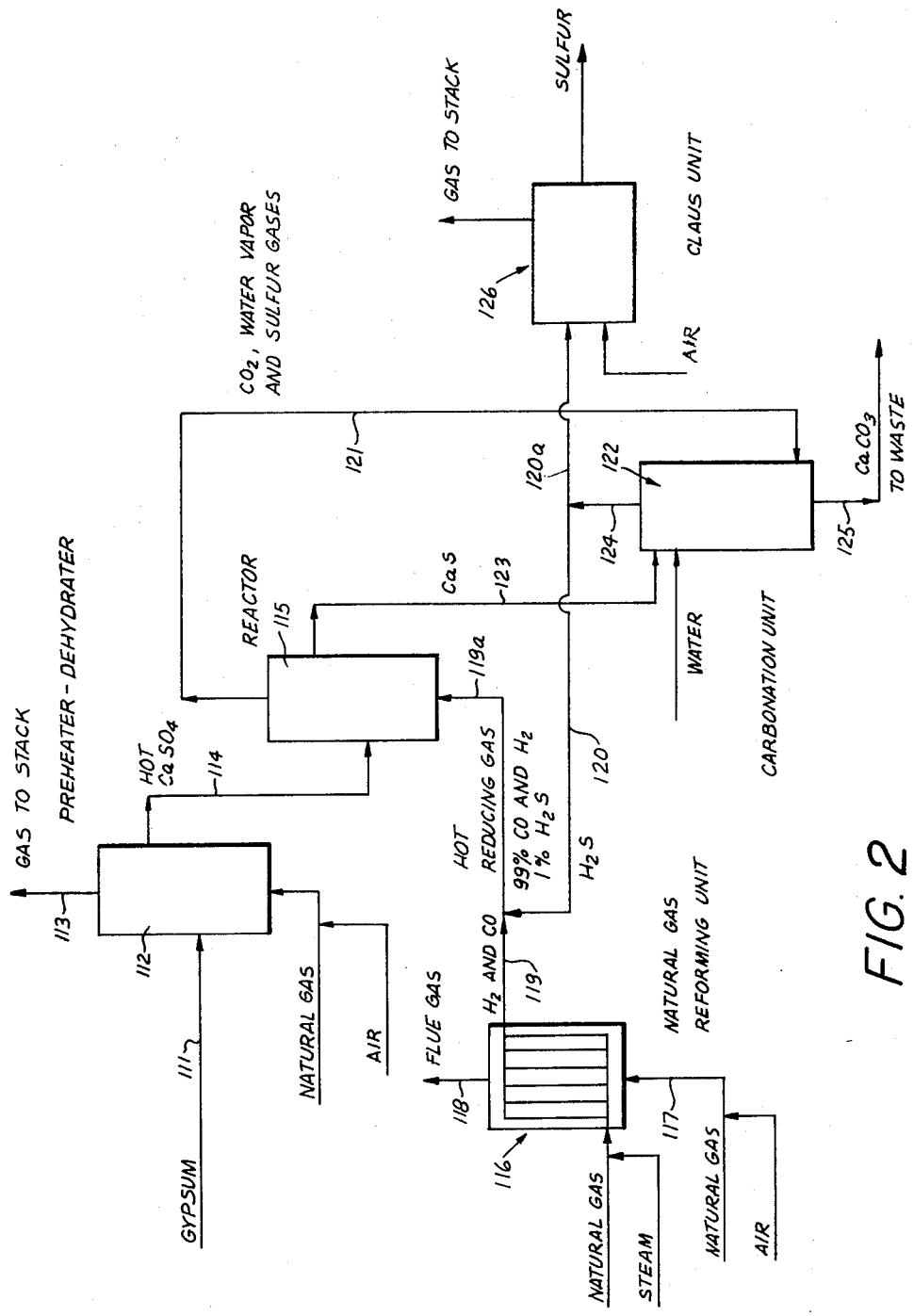

Although the novel features which are believed to be characteristic of the invention are pointed out in the annexed claims, the invention itself as to its objects and advantages and the manner in which it may be carried out may be better understood by reference to the following more detailed description, considered in connection with the accompanying drawings, forming a part hereof, in which FIG. 1 is a diagrammatic illustration of apparatus in which the invention may be carried out; and FIG. 2 is a diagrammatic illustration or block flow diagram for illustrating a process embodying the invention.

The following examples will serve to illustrate the increase in rate of reaction brought about by the use of the accelerator agents referred to above when compared to the rate of reaction without the use of the accelerator agents when calcium sulfate is reacted with a reductant to form calcium sulfide.

EXAMPLE 1

In this example, in one test calcium sulfate was reduced by using hydrogen as the reductant with addition of hydrogen sulfide as the accelerator and in another test under similar conditions calcium sulfate was reduced by using hydrogen as the reductant but without the accelerator, the purpose being to compare the respective rates of reduction of the calcium sulfate to calcium sulfide.

Referring to FIG. 1, the apparatus consisted of a combustion tube 10 mounted in a vertical position and heated by an electrical tube furnace 11. The voltage across the furnace and hence the temperature was regulated and controlled manually by an adjustable voltage transformer.

A charge 12 of gypsum particles passing a 20-mesh but retained on a 65-mesh Tyler screen sieve, was placed in the hot zone 13 of the combustion tube and was supported by a layer 14 of broken ¼-inch ceramic Raschig rings. A bed of these particles 6 inches deep was provided. The temperature was determined by using an alumel-chromel thermocouple 15 extending 3 inches into the bed. A small dual-float rotameter 16 was connected in the line 17 from the hydrogen source to measure its flow and the line 17a was connected into the combustion tube 10. A valve 18 was connected on line 17 to regulate gas flow. Provision was made to inject hydrogen sulfide (or other accelerator gas) through a line 19 connected to line 17a to the combustion tube (the reactor vessel); this line 19 also having a dual-float rotameter 20 for measuring the flow of hydrogen sulfide and a valve 21 for regulating gas flow. A line 22 for exit gases from the combustion tube was connected to an ice-cooled flask 23 which was connected in series through line 22a and 22b with a tube 24 packed with magnesium perchlorate 25 and with another tube 26 packed with an acid gas absorbent substance 27 for removal of acid gases such as hydrogen sulfide and carbon dioxide (in this case a material sold under the trademark "Ascarite"); this arrangement being such as to remove acid gases such as hydrogen sulfide, sulfur dioxide or carbon dioxide from the gas stream discharged from the reactor vessel. A conduit 22c, having another dual-float rotameter 28, to measure residual gas flow, was provided to carry away residual gases leaving this apparatus.

The 6-inch bed 12 of gypsum particles was brought up to desired temperature while passing nitrogen (which is inert) through line 17, 17a through the charge. When the desired temperature of 1,500° F. was reached, the nitrogen flow was stopped and hydrogen gas was metered through meter 16 into the reaction vessel and passed through the bed of particles at a relatively high rate for 60 seconds in order to flush out the nitrogen from the system. After 60 seconds the hydrogen flow was adjusted to give the gas stream a space velocity in the reactor vessel 10 of 0.5 cubic centimeter of hydrogen (at run conditions) per second per cubic centimeter of initial bed volume. The unreacted hydrogen leaving the system was measured by dual-float rotameter 28.

At 14 minutes into the run, hydrogen sulfide was introduced into the feedline 19, 19a, 19b and metered in through meter 20 at a rate required to produce a gas passing through line 17a and entering the reactor vessel which contained 99 percent hydrogen and 1 percent hydrogen sulfide. The water vapor and sulfur vapor from the reaction in the reactor vessel was condensed in the ice-cooled flask 23. It was determined that upon introduction of the hydrogen sulfide, the hydrogen consumed in the reactor vessel 10 by oxidation of hydrogen gradually increased from 57 percent (conditions in which the gas fed contained only hydrogen as reductant) to 85 percent (conditions in which the gas fed was 99 percent hydrogen-reductant—and 1 percent hydrogen sulfide—accelerator agent).

This shows the increase in the rate of reaction and hence that the calcium sulfate is reduced at a materially faster rate to calcium sulfide when the accelerator is used when compared with the rate of reaction when it is not.

EXAMPLE 2

Apparatus similar to that described in example 1 was used to study the reduction of calcium sulfate with natural gas as the reductant; however, no measurement was made of the unreacted gas leaving the bed. Average utilizations of the gas for 20-minute runs were calculated from analyses of the beds. As in example 1 the reducing gas was fed at a space velocity of 0.5 cubic centimeter of gas (at run conditions) per second per cubic centimeter of initial bed. Sulfur dioxide, passed through line 19, 19a, 19b, instead of hydrogen sulfide, was used to accelerate the reduction.

At 1,600° F. the average utilization of the natural gas without an accelerator additive was 9 percent. The addition of 3 percent sulfur dioxide increased the average utilization to 48 percent; again showing the increase in the rate of reaction when sulfur dioxide is used as an accelerator agent.

EXAMPLE 3

A 40-gram mixture of about 13.4 percent pulverized petroleum coke and about 86.6 percent −20 to +65 Tyler mesh natural gypsum was dried, dehydrated, cooled, and then divided into two samples of about 20 grams each. One of these samples was supported in the combustion tube 10 by quartz fiber on ¼-inch broken ceramic Raschig rings. A chromel-alumel thermocouple and a small ceramic tube extended through and terminated about one-half inch above this bed. Quartz fiber was placed on top of this bed and broken Raschig rings were added to a depth of about 1 inch. On top of these Raschig rings were placed quartz fiber, the other petroleum coke-calcium sulfate sample, more quartz fiber, and about 1 inch of additional broken ¼-inch Raschig rings in that order. The result was two 1½-inch deep beds of the petroleum coke-calcium sulfate composite separated by a 1 inch zone of broken ceramic Raschig rings and sandwiched between thin layers of quartz fiber.

Nitrogen was fed beneath the beds at 25 cubic centimeters per minute. Sulfur dioxide was injected at a rate of 25 cubic centimeters per minute through a small ceramic tube into the neutral zone just below the upper bed. Flow rates of both the nitrogen and the sulfur dioxide were based on ambient conditions.

While the empty tube furnace was being preheated to 1,500° F., the gas flow rates through the dual beds were adjusted to the described rates. When the temperature of the tube furnace reached 1,500° F., the combustion tube, containing the dual beds with the gas flows already constant, was quickly inserted into the tube furnace. After 30 minutes the temperature in the neutral zone reached 1,500° F. The apparatus was held at this temperature for an additional 30 minutes. The combustion tube was then quickly withdrawn and with the nitrogen flow continuing through the beds, the tube was allowed to cool in the open air.

Analyses of the beds established that the bottom bed contained about 8 percent sulfide expressed as calcium sulfide whereas the upper bed contained about 25 percent sulfide expressed as calcium sulfide. In other words, the bed receiving the sulfur dioxide produced more than three times as much sulfide in the same length of time and under similar conditions as the bed receiving nitrogen only.

EXAMPLE 4

Essentially the same apparatus and procedure as described in example 1 were used to test the effect of the addition of hydrogen sulfide on the reduction of calcium sulfate with carbon monoxide. However, since very little water vapor was generated and since the primary gaseous reaction product was carbon dioxide, a large bed of "Ascarite" acid gas absorbent material and ½-inch Raschig rings was substituted for the ice-cooled condenser previously described. The purpose of the Raschig rings mixed in the "Ascarite" material was to provide more voids and thereby to reduce the likelihood of plugging. Also, the practice of introducing the reductant at a relatively high rate for the first 60 seconds was discontinued.

As in example 1, a 6-inch deep bed of −20 to +65 mesh gypsum was preheated to about 1,500° F. Carbon monoxide was fed at a space velocity of 0.5 cubic centimeter of gas (at run conditions) per second per cubic centimeter of initial bed. At 14 minutes into the run hydrogen sulfide was injected into the carbon monoxide stream to produce a final reducing gas containing 1 percent hydrogen sulfide and 99 percent carbon monoxide. The oxidation of carbon monoxide by calcium sulfate increased from about 13 percent to about 55 percent, showing that the addition of only 1 percent hydrogen sulfide as accelerator agent more than tripled the conversion at equivalent space velocities and test conditions.

EXAMPLE 5

Virtually the same apparatus and procedure described in example 4 were used to study the effect of addition of sulfur dioxide on the reduction of calcium sulfate with carbon monoxide. This test was also conducted at 1,500° F. and an input space velocity of 0.5 cubic centimeter of gas per second per cubic centimeter of initial bed. The addition of 1 percent sulfur dioxide increased the conversion of carbon monoxide from about 16 percent to approximately 56 percent. These results are comparable to the results obtained by the addition of 1 percent hydrogen sulfide described in the previous example.

EXAMPLE 6

A test to determine the effect of 1 percent carbonyl sulfide on the reduction of calcium sulfate with carbon monoxide was performed according to the procedure described in examples 4 and 5. As before, −20 to +65 mesh particles were preheated to 1,500° F. and reacted with the reducing gas at an input space velocity of 0.5 cubic centimeter per second per cubic centimeter of initial calcium sulfate bed volume.

On introduction of the carbonyl sulfide the conversion of the carbon monoxide increased from about 15 to about 63 percent.

EXAMPLE 7

A test to determine the effect of carbon disulfide on the reduction of calcium sulfate with carbon monoxide was made at approximately 1,500° F. at an input carbon monoxide space velocity of 0.5 cubic centimeter of gas per second per cubic centimeter of initial bed volume. However, since carbon disulfide is a liquid at ambient conditions, it cannot conveniently be metered into the carbon monoxide stream as described in the three previous examples. Carbon disulfide vapors were added to the carbon monoxide gas stream by passing the carbon monoxide over the surface of liquid carbon disulfide. The liquid disulfide was contained in a flask which was submerged in an ice bath. The ice bath helped to prevent excessive vaporization of the carbon disulfide.

The conversion of 98 percent of the carbon monoxide was attained in this manner. Under similar conditions of temperature, space velocity, and bed dimensions but without addition of the accelerator agent the conversion reached only 15 percent.

EXAMPLE 8

To demonstrate the effect of sulfur vapor on the reduction of calcium sulfate, a test using carbon monoxide as the reductant was made with essentially the same apparatus, particle size range, bed temperature, and input space velocity as in example 1. Crushed solid sulfur was mixed with the broken ¼-inch ceramic Raschig rings which supported the gypsum bed.

The combustion tube was placed into the furnace such that the portion of the Raschig ring section containing the sulfur was not in the hot zone of the furnace. The bed was dehydrated and preheated to 1,500° F. while under a nitrogen purge. When the calcium sulfate bed reached 1,500° F., the gas flow through the tube was changed from nitrogen to carbon monoxide. The tube was then pushed further into the furnace such that the Raschig ring section containing the sulfur could receive enough heat to melt some of the sulfur. A small amount of sulfur was vaporized into the carbon monoxide as the gas stream contacted the hot melted sulfur.

Conversion of carbon monoxide to carbon dioxide reached about 95 percent or about six times the conversion obtained in previous similar experiments with the use of carbon monoxide only. To reach 95 percent under the same conditions with only pure carbon monoxide as the reductant requires a temperature of about 1,800° F.

The method of increasing the rate of reduction of calcium sulfate to calcium sulfide is admirably suited for use in a process for the production of elemental sulfur from gypsum, anhydrite, phosphogypsum and other similar materials from which calcium sulfate may be derived. The flow diagram of FIG. 2 illustrates one such process.

Referring now to the flow diagram FIG. 2, crushed gypsum screened to particle sizes which pass a 20-mesh screen and retained on a 65-mesh screen (Tyler standard), is continuously fed, by suitable conveyor means 111 to a fluidized-bed preheater 112, where it is dehydrated and heated to 600°–800° F. As shown, the preheater is heated by burning natural gas with air, the residual gaseous products of the combustion of the natural gas are discharged through stack 113. The hot calcium sulfate (the source of which is the gypsum) is fed by suitable conveyor means 114 to a reactor vessel 115, of the fluidized-bed type, wherein the calcium sulfate is reduced to calcium sulfide and the reactants in the reactor are maintained at a temperature within the range of 1,400° and 1,700° F. The reductant is a mixture of hydrogen and carbon monoxide. Any suitable reactor vessel may be used which will insure intimate contact between the calcium sulfate particles and the reductant used for the reduction reaction.

The reductant gas is obtained by reforming natural gas in gas reformer 116 of the type wherein natural gas is reacted with steam at elevated temperature, the heat for the endothermic reaction being supplied by burning natural gas with air passed through line 117; the products of this combustion (the flue gas) being discharged through stack 118. The reformed gas from reformer 116, containing hydrogen and carbon monoxide is passed at a temperature which may be 1,400°–1,500° F. through line 119 which is connected to the reactor vessel 115. Hydrogen sulfide as accelerator agent, is added to the reformed gas which passes through line 119 by passing the hydrogen sulfide through a connecting line 120 at a rate to provide a gaseous mixture of hydrogen, carbon monoxide and hydrogen sulfide passing through line 119a to reactor 115, in which there is 99 percent of combined hydrogen and carbon monoxide and 1 percent hydrogen sulfide. Sufficient gas is introduced into the reactor 115 through line 119a to maintain a temperature in the reaction bed of calcium sulfate particles of about 1,500° F.; bearing in mind that in this instance the reaction is exothermic.

The gases, produced by the reduction reaction of the calcium sulfate to calcium sulfide in the reactor, which now contain carbon dioxide, water vapor, and sulfur gases, are passed as a stream from reactor 115 through line 121 to a carbonation unit 122 and the calcium sulfide formed in the reactor by the reduction reaction with calcium sulfate is transferred by suitable conveyor means 123 to the carbonation unit 122 wherein water is added to form a slurry.

In the carbonation unit, the calcium sulfide is converted to calcium carbonate and the sulfide is converted to hydrogen sulfide, which passes out of the carbonation vessel 122 through line 124, in accordance with a known procedure. The calcium carbonate formed from the reaction of the calcium sulfide and carbon dioxide in the carbonation unit is removed through draw off means 125 as a waste product or for such utilitarian use as may be desired.

A sufficient amount of the hydrogen sulfide discharged from the carbonation unit is passed through line 124 into line 120 and into the hydrogen-carbon monoxide stream in line 119 from the gas reformer, to provide the desired concentration of hydrogen sulfide (accelerator agent) in the reducing gas passed into the reaction vessel 115. The remainder of the gas stream from the carbonation unit which contains hydrogen sulfide is passed through line 124 into line 120a to a Claus unit 126 where the hydrogen sulfide is converted to elemental sulfur by the well-known Claus reaction wherein the hydrogen sulfide is reacted with oxygen (air) and is converted to sulfur.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for increasing the rate of reaction in a process wherein calcium sulfate is reduced to calcium sulfide in a reaction vessel by the reaction between calcium sulfate and a gaseous reductant wherein the reductant consists essentially of hydrogen, carbon monoxide and mixtures thereof, said gaseous reductant being further characterized in that it is obtained from a first source whereby said gaseous reductant contains substantially less than 0.1 percent by volume of compounds containing one sulfur atom per molecule and substantially less than 0.05 percent by volume of compounds containing two sulfur atoms per molecule, which comprises supplying to said reaction, from an external second source, an accelerator agent selected from the group consisting of compounds which will provide in said reaction vessel a sulfur compound selected from the group consisting of sulfur vapor, sulfur dioxide and gaseous sulfide in an amount sufficient to provide a concentration of at least 0.1 percent by volume in the gaseous reductant in the case of sulfur compounds containing only one sulfur atom per molecule and at least 0.05 percent by volume in the gaseous reductant in the case of sulfur compounds containing two sulfur atoms per molecule, while maintaining the reaction temperature in said vessel within the range of 1,300° to 1,900° F.

2. The method of claim 1 wherein the concentration of sulfur compounds provided in the reaction vessel is from 0.1 to 10 percent by volume in the case of sulfur compounds containing one sulfur atom per molecule and from 0.05 to 5 percent volume in the case of sulfur compounds containing two sulfur atoms per molecule.

3. A process according to claim 1 in which the accelerator agent used is a gaseous sulfur compound selected from class consisting of hydrogen sulfide, carbonyl sulfide, carbon disulfide, and sulfur dioxide.

4. A process for producing calcium sulfide from a calcium-sulfate-containing material, such as, gypsum, anhydrite, phosphogypsum, or the like which comprises introducing a charge of comminuted, dehydrated calcium sulfate produced from aid calcium-sulfate-containing material into a reaction vessel maintained at a temperature of 1,300° to 1,900° F. with a gaseous reductant wherein the reductant consists essentially of hydrogen, carbon monoxide and mixtures thereof, said gaseous reductant being further characterized in that it is obtained from a first source whereby said gaseous reductant contains substantially less than 0.1 percent by volume of compounds containing one sulfur atom per molecule and substantially less than 0.05 percent by volume of compounds containing two sulfur atoms per molecule, supplying to said reaction, from an external second source, an accelerator agent selected from the group consisting of compounds which will provide in said reaction vessel a sulfur compound selected from the group consisting of sulfur vapor, sulfur dioxide and gaseous sulfide in an amount sufficient to provide a concentration of at least from 0.1 to 10 percent by volume in the gaseous reductant in the case of sulfur compounds containing only one sulfur atom and at least from 0.05 to 5 percent by volume in the gaseous reductant in the case of sulfur compounds containing two sulfur atoms per molecule.

5. A process according to claim 4 in which the accelerating agent is a gaseous sulfide.

6. A process according to claim 5 in which the gaseous reductant introduced into the reactor vessel contains 0.15 to 3 percent of the accelerator agent.

7. A process according to claim 5 in which the reaction vessel is maintained at a temperature in the neighborhood of 1,500° F.

8. A process according to claim 7 in which the accelerating agent is hydrogen sulfide, and the amount of hydrogen sulfide is about 1 percent of the gaseous reductant introduced into the reactor vessel.

9. A process according to claim 1 in which the reaction temperature is within the range of 1,400° to 1,700° F.

10. A process according to claim 4 in which the temperature is within the range of 1,400° to 1,700° F.

11. A process for producing calcium sulfide from gypsum, or the like, which comprises comminuting the gypsum, passing a charge of said comminuted gypsum the particles of which are within the range of minus 10 mesh and 65 mesh through a heating zone to dehydrate the gypsum and forming particles of calcium sulfate, passing the dehydrated, comminuted calcium sulfate through a reaction vessel maintained at a temperature of 1,300° to 1,900° F., providing a stream of gaseous reductant wherein the reductant consists essentially of hydrogen, carbon monoxide and mixtures thereof, said gaseous reductant being further characterized in that it is obtained from a first source whereby said gaseous reductant contains substantially less than 0.1 percent by volume of compounds containing one sulfur atom per molecule and substantially less than 0.05 percent by volume of compounds containing two sulfur atoms per molecule, adding to said stream of gaseous reductant, from an external second source, an accelerator agent selected from the group consisting of compounds which will provide in said reaction vessel a sulfur compound selected from the group consisting of sulfur vapor, sulfur dioxide and gaseous sulfide in an amount sufficient to provide a concentration of at least from 0.1 to 10 percent by volume in the gaseous reductant in the case of sulfur compounds containing only one sulfur atom per molecule and at least from 0.05 to 5 percent by volume in the gaseous reductant in the case of sulfur compounds containing two sulfur atoms per molecule, passing said gas stream through and in intimate contact with the particles of calcium sulfate in said vessel to reduce the calcium sulfate to calcium sulfide and forming a stream of carbon dioxide and water vapor as gaseous products of the reaction.

12. The process of claim 11 further including the step of passing said stream containing the carbon dioxide through a carbonation unit together with the calcium sulfide produced in the reactor vessel under conditions which convert the calcium sulfide to hydrogen sulfide and to calcium carbonate, passing a part of the hydrogen sulfide thus provided into the stream of hydrogen and carbon monoxide introduced into said reactor vessel to provide the hydrogen sulfide added as accelerator agent to said stream as aforesaid and converting the remainder of the hydrogen sulfide stream from said carbonation unit to elemental sulfur.

13. A process according to claim 12 in which the reactor vessel is maintained at a temperature in the neighborhood of 1,500° F.

14. A process according to claim 13 in which the stream of reductant consists essentially of hydrogen and carbon monoxide and is produced by reforming natural gas.

15. A process according to claim 14 in which the comminuted gypsum prior to introduction into the reactor vessel is heated to a temperature of 600° to 800° F.

16. A process according to claim 12 in which the temperature is within the range of 1,400° to 1,700° F.

* * * * *

UNITED STATES PATENT OFFICE
CERTIFICATE OF CORRECTION

Patent No. 3,640,682                          Dated February 8, 1972

Inventor(s) Jay Charles Smith and James R. Reinhardt

It is certified that error appears in the above-identified patent and that said Letters Patent are hereby corrected as shown below:

Abstract, line 7, after "gaseous sulfur" insert
-- compound, such as hydrogen sulfide or other sulfur compound --;

Col. 2, line 12, "or" should be -- of --;

3, line 9, After "percent" insert -- by --;

6, line 59, After "liquid" insert -- carbon --;

8, line 52, After "cent" insert -- by --;

8, line 62, "aid" should -- said --;

10, line 21, "provided" should be -- produced --.

Signed and sealed this 11th day of July 1972.

(SEAL)
Attest:

EDWARD M. FLETCHER, JR.        ROBERT GOTTSCHALK
Attesting Officer             Commissioner of Patents